US009589120B2

(12) United States Patent
Samuel et al.

(10) Patent No.: US 9,589,120 B2
(45) Date of Patent: Mar. 7, 2017

(54) BEHAVIOR BASED AUTHENTICATION FOR TOUCH SCREEN DEVICES

(71) Applicant: Microsoft Corporation, Redmond, WA (US)

(72) Inventors: Arjmand Samuel, Redmond, WA (US); Muhammad Shahzad, Lansing, MI (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 179 days.

(21) Appl. No.: 13/857,155

(22) Filed: Apr. 5, 2013

(65) Prior Publication Data

US 2014/0300554 A1   Oct. 9, 2014

(51) Int. Cl.
| | | |
|---|---|---|
| G06F 21/32 | (2013.01) | |
| H04W 12/06 | (2009.01) | |
| G06F 21/36 | (2013.01) | |
| G06F 3/0488 | (2013.01) | |

(52) U.S. Cl.
CPC .......... *G06F 21/32* (2013.01); *G06F 3/04883* (2013.01); *G06F 21/36* (2013.01); *H04W 12/06* (2013.01); *G06F 2203/04808* (2013.01)

(58) Field of Classification Search
CPC ..... G06F 21/32; G06F 21/36; G06K 9/00167; G06K 9/00181; G06K 9/00187
USPC .......................................................... 345/173
See application file for complete search history.

(56) References Cited

U.S. PATENT DOCUMENTS

| | | | |
|---|---|---|---|
| 7,219,368 B2 | 5/2007 | Juels et al. | |
| 8,174,503 B2 | 5/2012 | Chin | |
| 8,683,582 B2 * | 3/2014 | Rogers | 726/21 |
| 8,704,792 B1 * | 4/2014 | Kataoka et al. | 345/173 |
| 2008/0036743 A1 * | 2/2008 | Westerman et al. | 345/173 |
| 2009/0293119 A1 | 11/2009 | Jonsson | |
| 2009/0313693 A1 * | 12/2009 | Rogers | 726/21 |
| 2012/0179756 A1 * | 7/2012 | Colella | H04L 63/08 709/204 |
| 2012/0198529 A1 | 8/2012 | Theimer et al. | |

(Continued)

OTHER PUBLICATIONS

Peralta et al., "Interactive Gesture-based Authentication for Tabletope Devices", Technical Report, Nov. 2011.*

(Continued)

*Primary Examiner* — Benjamin C Lee
*Assistant Examiner* — Xuemei Zheng
(74) *Attorney, Agent, or Firm* — Alin Corie; Sandy Swain; Micky Minhas

(57) ABSTRACT

A method, system, and one or more computer-readable storage media for behavior based authentication for touch screen devices are provided herein. The method includes acquiring a number of training samples corresponding to a first action performed on a touch screen of a touch screen device, wherein the first action includes an input of a signature or a gesture by a legitimate user. The method also includes generating a user behavior model based on the training samples and acquiring a test sample corresponding to a second action performed on the touch screen, wherein the second action includes an input of the signature or the gesture by a user. The method further includes classifying the test sample based on the user behavior model, wherein classifying the test sample includes determining whether the user is the legitimate user or an imposter.

18 Claims, 6 Drawing Sheets

(56) References Cited

U.S. PATENT DOCUMENTS

| | | | |
|---|---|---|---|
| 2013/0120282 A1* | 5/2013 | Kukulski | 345/173 |
| 2013/0265276 A1* | 10/2013 | Obeidat et al. | 345/174 |

OTHER PUBLICATIONS

Frank et al., "Touchalytics: On the Applicability of Touchscreen Input as a Behavioral Biometric for Continuous Authentication," IEEE Transactions on Information Forensics and Security, vol. 8, No. 1, p. 136-148, Jan. 2013.*

Guse, Dennis., "Gesture-based User Authentication on Mobile Devices using Accelerometer and Gyroscope", Retrieved at <<http://www.user.tu-berlin.de/g00se/Guse%20-%20Master-Thesis%20-%20Gesture-based%20User%20Authentication%20Mobile%20Device%20using%20Accelerometer%20and%20Gyroscope.pdf>>, A Thesis Submitted in Partial Fulfillment of the Requirements of the Berlin Institute of Technology for the Master's Degree, May 31, 2011, pp. 110.

Casasola, Alessandro., "Distinguishing Freehand Drawing Recognition for Biometric Authentication on Android-Powered Mobile Devices", Retrieved at <<http://tesi.cab.unipd.it/41274/1/Tesi_Alessandro_Casasola.pdf>>, A Thesis Submitted in Partial Fulfillment of the Requirements of the University of Padua for the Master's Degree in Computer Engineering, Oct. 15, 2012, pp. 55.

Sayed, Bassam., "A Static Authentication Framework Based on Mouse Gesture Dynamics", Retrieved at <<http://dspace.library.uvic.ca:8080/bitstream/handle/1828/2833/BassamSayed_V00160254.pdf?sequence=1>>, A Dissertation Submitted in Partial Fulfillment of the Requirements of the University of Victoria for the Master's Degree in department of Electrical and Computer Engineering, Jun. 2, 2010, pp. 102.

Luca, et al., "Touch Me Once and I know it's You! Implicit Authentication Based on Touch Screen Patterns", Retrieved at <<http://www.medien.ifi.lmu.de/pubdb/publications/pub/deluca2012chi/deluca2012chi.pdf>>, SIGCHI Conference on Human Factors in Computing Systems, May 8, 2012, pp. 10.

Jermyn, et al., "The Design and Analysis of Graphical Passwords", Retrieved at <<http://static.usenix.org/events/sec99/full_papers/jermyn/jermyn.pdf>>, 8th conference on USENIX Security Symposium, vol. 8, Aug. 23, 1999, pp. 15.

* cited by examiner

600

BEHAVIOR BASED AUTHENTICATION FOR TOUCH SCREEN DEVICES

BACKGROUND

Mobile computing devices equipped with touch screens have become very prevalent. Many applications that were commonly executed on desktop computers in the past are now also being executed on such touch screen devices. For example, email applications, social networking applications, electronic commerce applications, and online banking applications are now being executed on touch screen devices. Authenticating users of touch screen devices is important because the devices often contain sensitive data, such as personal photos, email information, credit card numbers, passwords, business data, corporate secrets, or the like, relating to the applications executing on the devices.

According to existing procedures for authenticating users of touch screen devices, the user either enters a password/PIN code or draws a geometric pattern on a grid of points in a predefined sequence. However, touch screen devices are often used in public settings. Therefore, attackers may be able to spy on users to determine the passwords/PIN codes or patterns for their touch screen devices relatively easily. Furthermore, attackers may be able to extract the passwords/PIN codes or patterns for touch screen devices from recent user input based on smudges or marks left on the touch screens by users' fingers, touch pens, or other touch input devices.

SUMMARY

The following presents a simplified summary of the present embodiments in order to provide a basic understanding of some aspects described herein. This summary is not an extensive overview of the claimed subject matter. It is intended to neither identify critical elements of the claimed subject matter nor delineate the scope of the present embodiments. Its sole purpose is to present some concepts of the claimed subject matter in a simplified form as a prelude to the more detailed description that is presented later.

An embodiment provides a method for behavior based authentication for touch screen devices. The method includes acquiring a number of training samples corresponding to a first action performed on a touch screen of a touch screen device, wherein the first action includes an input of a signature or a gesture by a legitimate user. The method also includes generating a user behavior model based on the training samples and acquiring a test sample corresponding to a second action performed on the touch screen, wherein the second action includes an input of the signature or the gesture by a user. The method further includes classifying the test sample based on the user behavior model, wherein classifying the test sample includes determining whether the user is the legitimate user or an imposter.

Another embodiment provides a touch screen device that includes a touch screen, a processor that is adapted to execute stored instructions, and a system memory. The system memory includes code configured to acquire a number of training samples corresponding to a first action performed on the touch screen, wherein the first action includes an input of a signature or a gesture by a legitimate user. The system memory also includes code configured to generate a user behavior model based on the training samples and acquire a test sample corresponding to a second action performed on the touch screen, wherein the second action includes an input of the signature or the gesture by a user. The system memory further includes code configured to classify the test sample based on the user behavior model, wherein classifying the test sample includes determining whether the user is the legitimate user or an imposter.

In addition, another embodiment provides one or more computer-readable storage media for storing computer-readable instructions. The computer-readable instructions provide for behavior based authentication of a touch screen device when executed by one or more processing devices. The computer-readable instructions include code configured to acquire training samples corresponding to a first action including an input of a signature or a gesture on a touch screen of the touch screen device, extract features corresponding to the action from the training samples, and select a portion of the features that have consistent values for all of the training samples. The computer-readable instructions also include code configured to extract behaviors corresponding to the portion of the features from the training samples, partition the training samples into training groups based on the behaviors corresponding to the portion of the features, and generate a user behavior model for each training group. The computer-readable instructions also include code configured to acquire a test sample corresponding to a second action including an input of the signature or the gesture on the touch screen, extract the portion of the features that have consistent values for all of the training samples from the test sample, and extract test behaviors corresponding to the portion of the features from the test sample. The computer-readable instructions further include code configured to classify the test sample by comparing the test behaviors extracted from the test sample to the behaviors corresponding to the training groups based on the user behavior models.

The following description and the annexed drawings set forth in detail certain illustrative aspects of the claimed subject matter. These aspects are indicative, however, of but a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

DETAILED DESCRIPTION

Figure 1:
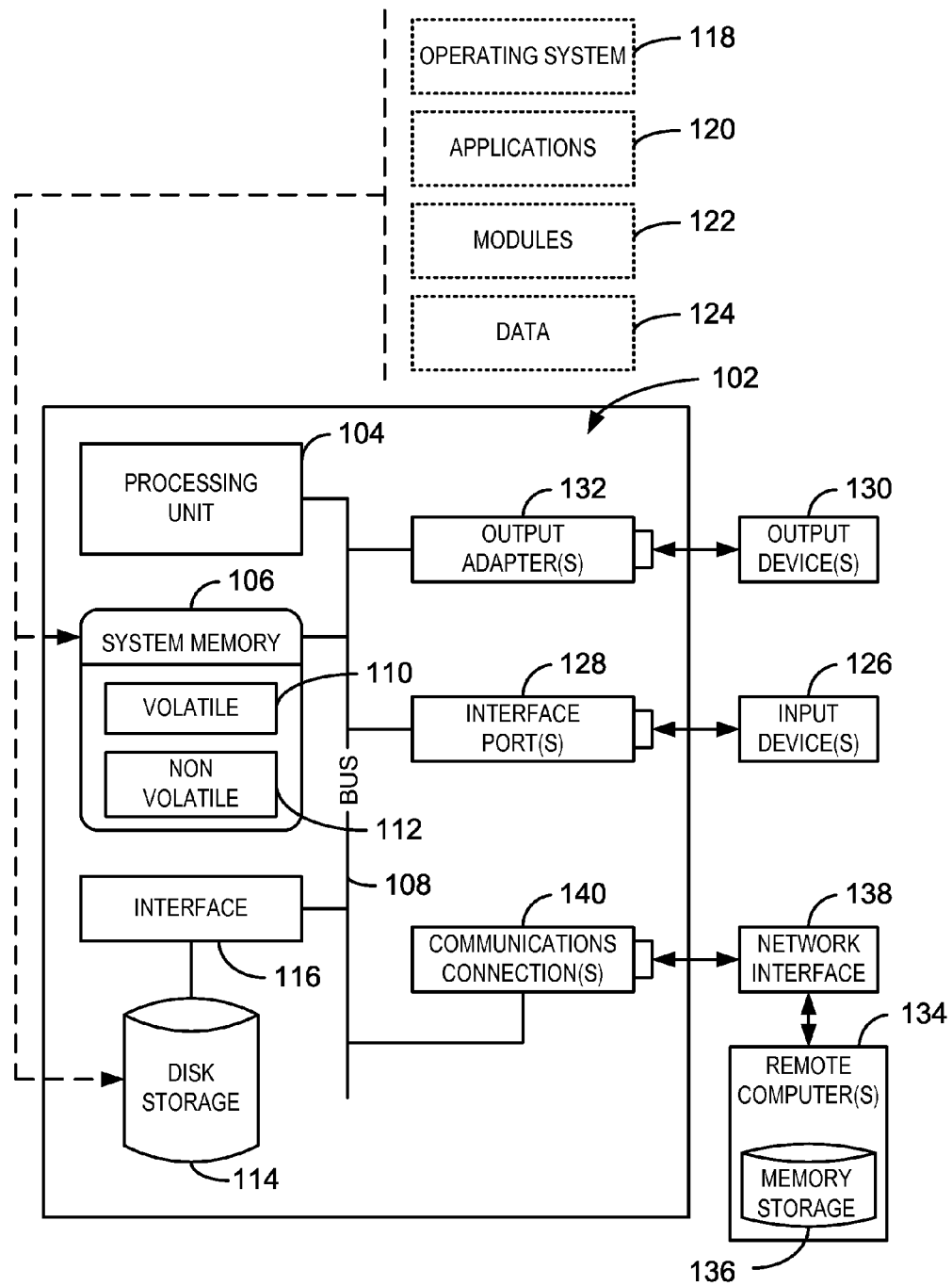
FIG. 1 is a block diagram of a computing environment that may be used to implement a system and method for behavior based authentication for touch screen devices.

According to existing procedures for authenticating users of touch screen devices, the user either enters a password/

PIN code or draws a geometric pattern on a grid of points in a predefined sequence. However, as discussed above, such procedures are susceptible to attempts by attackers to obtain users' sensitive data. Therefore, embodiments described herein are directed to a method, system, and one or more computer-readable storage media for behavior based authentication for touch screen devices.

While existing authentication procedures for touch screen devices are based only the actual data that is input by users, embodiments described herein provide a behavior based authentication procedure that is based on the actual data that is input by the users as well as the manner in which the data is input by the users. Specifically, according to embodiments described herein, the touch screen device requests the user to perform a particular action on the touch screen. The touch screen device then extracts behavior features from the particular action. Such behavior features may include, but are not limited to, stroke time, inter-stroke time, displacement magnitude, displacement direction, pressure, velocity magnitude, and velocity direction. Because users typically have unique and fairly consistent input behavior, it may be assumed that the extracted behavior features are specific to the particular user. Therefore, the extracted behavior features may be used to authenticate the user of the touch screen device.

According to embodiments described herein, particular actions that may be performed by users include the input of a gesture or the input of a personal signature. As used herein, the term "gesture" refers to a brief interaction of a user's fingers with a touch screen. For example, a gesture may include a swipe rightwards or a pinch with two fingers on the touch screen. In addition, as used herein, the term "personal signature" refers to a specific interaction of a user's fingers, touch pen, or other touch input device with the touch screen. For example, a personal signature may include an input of a user's name. In various embodiments, behavior features may be extracted for a gesture or a personal signature based on the actual input of the gesture or the personal signature as well as the manner in which the gesture or personal signature is input.

The behavior based authentication procedure described herein is significantly more difficult to compromise than existing authentication procedures because it is difficult for attackers to emulate the behavior of users by inputting gestures or personal signatures in a particular manner. Even if an attacker is somehow capable of perfectly reproducing a user's personal signature, it is highly unlikely that the attacker will be able to reproduce the user's behavior of inputting the personal signature on a touch screen device.

Many existing authentication procedures rely on biometric features relating to users. Such biometric features may include users' fingerprints, DNA, irises, odors, hands, faces, or ears, among others. By contrast, the authentication procedure described herein relies on behavior features relating to users rather than biometric features. Therefore, the authentication procedure described herein provides significant advantages compared to authentication procedures that rely on biometric features. Specifically, the authentication procedure described herein is secure against attempts to extract the passwords/PIN codes or patterns for touch screen devices from recent user input based on smudges or marks left on the touch screens by users' fingers. In addition, the authentication procedure described herein does not rely on any additional hardware, such as fingerprint readers or the like, for extracting biometric features.

Furthermore, existing authentication procedures do not provide for the authentication of users based on the manner in which they input signatures on touch screen devices using their fingers. Rather, existing authentication procedures have only focused on signatures performed with a touch pen (either conventional or digital) and can be categorized into offline signature verification procedures and online signature verification procedures. Offline signature verification procedures use signatures in the form of images, while online signature verification procedures use signatures in the form of time stamped data points matched with training samples of the signatures. According to both offline and online signature verification procedures, features are extracted from the entire signature. By contrast, according to the authentication procedure described herein, features are extracted only from those subparts of the signature that have consistent values of features across training samples.

As a preliminary matter, some of the figures describe concepts in the context of one or more structural components, variously referred to as functionality, modules, features, elements, or the like. The various components shown in the figures can be implemented in any manner, such as via software, hardware (e.g., discrete logic components), or firmware, or any combinations thereof. In some embodiments, the various components may reflect the use of corresponding components in an actual implementation. In other embodiments, any single component illustrated in the figures may be implemented by a number of actual components. The depiction of any two or more separate components in the figures may reflect different functions performed by a single actual component. FIG. 1, discussed below, provides details regarding one system that may be used to implement the functions shown in the figures.

Other figures describe the concepts in flowchart form. In this form, certain operations are described as constituting distinct blocks performed in a certain order. Such implementations are exemplary and non-limiting. Certain blocks described herein can be grouped together and performed in a single operation, certain blocks can be broken apart into plural component blocks, and certain blocks can be performed in an order that differs from that which is illustrated herein, including a parallel manner of performing the blocks. The blocks shown in the flowcharts can be implemented by software, hardware, firmware, manual processing, or the like. As used herein, hardware may include computer systems, discrete logic components, such as application specific integrated circuits (ASICs), or the like.

As to terminology, the phrases "configured to" and "adapted to" encompass any way that any kind of functionality can be constructed to perform an identified operation. The functionality can be configured to (or adapted to) perform an operation using, for instance, software, hardware, firmware, or the like.

The term "logic" encompasses any functionality for performing a task. For instance, each operation illustrated in the flowcharts corresponds to logic for performing that operation. An operation can be performed using, for instance, software, hardware, firmware, or the like.

As used herein, the terms "component," "system," "server," and the like are intended to refer to a computer-related entity, either hardware, software (e.g., in execution), or firmware, or any combination thereof. For example, a component can be a process running on a processor, an object, an executable, a program, a function, a library, a subroutine, a computer, or a combination of software and hardware.

By way of illustration, both an application running on a server and the server can be a component. One or more components can reside within a process, and a component can be localized on one computer and/or distributed between two or more computers. The term "processor" is generally understood to refer to a hardware component, such as a processing unit of a computer system.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable storage device or media.

Computer-readable storage media can include but are not limited to magnetic storage devices (e.g., hard disk, floppy disk, and magnetic strips, among others), optical disks (e.g., compact disk (CD) and digital versatile disk (DVD), among others), smart cards, and flash memory devices (e.g., card, stick, and key drive, among others). In contrast, computer-readable media (i.e., not storage media) generally may additionally include communication media such as transmission media for wireless signals and the like.

In order to provide context for implementing various aspects of the claimed subject matter, FIG. 1 and the following discussion are intended to provide a brief, general description of a computing environment in which the various aspects of the subject innovation may be implemented. For example, a method and system for behavior based authentication for touch screen devices can be implemented in such a computing environment. While the claimed subject matter has been described above in the general context of computer-executable instructions of a computer program that runs on a local computer or remote computer, those of skill in the art will recognize that the subject innovation also may be implemented in combination with other program modules. Generally, program modules include routines, programs, components, data structures, or the like that perform particular tasks or implement particular abstract data types.

Moreover, those of skill in the art will appreciate that the subject innovation may be practiced with other computer system configurations. For example, the subject innovation may be practiced with single-processor or multi-processor computer systems, minicomputers, mainframe computers, personal computers, hand-held computing devices, microprocessor-based or programmable consumer electronics, or the like, each of which may operatively communicate with one or more associated devices. The illustrated aspects of the claimed subject matter may also be practiced in distributed computing environments wherein certain tasks are performed by remote processing devices that are linked through a communications network. However, some, if not all, aspects of the subject innovation may be practiced on stand-alone computers. In a distributed computing environment, program modules may be located in local or remote memory storage devices.

FIG. 1 is a block diagram of a computing environment 100 that may be used to implement a system and method for behavior based authentication for touch screen devices. The computing environment 100 includes a computer 102. The computer 102 may be any suitable type of touch screen device, such as a mobile phone or tablet computer. The computer 102 includes a processing unit 104, a system memory 106, and a system bus 108. The system bus 108 couples system components including, but not limited to, the system memory 106 to the processing unit 104. The processing unit 104 can be any of various available processors. Dual microprocessors and other multiprocessor architectures also can be employed as the processing unit 104.

The system bus 108 can be any of several types of bus structures, including the memory bus or memory controller, a peripheral bus or external bus, or a local bus using any variety of available bus architectures known to those of ordinary skill in the art. The system memory 106 is computer-readable storage media that includes volatile memory 110 and non-volatile memory 112. The basic input/output system (BIOS), containing the basic routines to transfer information between elements within the computer 102, such as during start-up, is stored in non-volatile memory 112. By way of illustration, and not limitation, non-volatile memory 112 can include read-only memory (ROM), programmable ROM (PROM), electrically-programmable ROM (EPROM), electrically-erasable programmable ROM (EEPROM), or flash memory.

Volatile memory 110 includes random access memory (RAM), which acts as external cache memory. By way of illustration and not limitation, RAM is available in many forms, such as static RAM (SRAM), dynamic RAM (DRAM), synchronous DRAM (SDRAM), double data rate SDRAM (DDR SDRAM), enhanced SDRAM (ESDRAM), SynchLink™ DRAM (SLDRAM), Rambus® direct RAM (RDRAM), direct Rambus® dynamic RAM (DRDRAM), and Rambus® dynamic RAM (RDRAM).

The computer 102 also includes other computer-readable storage media, such as removable/non-removable, volatile/non-volatile computer storage media. FIG. 1 shows, for example, a disk storage 114. Disk storage 114 may include, but is not limited to, a magnetic disk drive, floppy disk drive, tape drive, Jaz drive, Zip drive, LS-100 drive, flash memory card, or memory stick.

In addition, disk storage 114 can include storage media separately or in combination with other storage media including, but not limited to, an optical disk drive such as a compact disk ROM device (CD-ROM), CD recordable drive (CD-R Drive), CD rewritable drive (CD-RW Drive), or a digital versatile disk ROM drive (DVD-ROM). To facilitate connection of the disk storage 114 to the system bus 108, a removable or non-removable interface is typically used, such as interface 116.

It is to be appreciated that FIG. 1 describes software that acts as an intermediary between users and the basic computer resources described in the computing environment 100. Such software includes an operating system 118. The operating system 118, which can be stored on disk storage 114, acts to control and allocate resources of the computer 102.

System applications 120 take advantage of the management of resources by the operating system 118 through program modules 122 and program data 124 stored either in system memory 106 or on disk storage 114. It is to be appreciated that the claimed subject matter can be implemented with various operating systems or combinations of operating systems.

A user enters commands or information into the computer 102 through input devices 126. According to embodiments described herein, input devices 216 include a touch screen. In addition, input devices 126 can include, but are not limited to, a pointing device (such as a mouse, trackball, stylus, or the like), a keyboard, a microphone, a voice input device, a joystick, a satellite dish, a scanner, a TV tuner card, a digital camera, a digital video camera, a web camera, or the like. The input devices 126 connect to the processing unit 104 through the system bus 108 via interface port(s) 128. Interface port(s) 128 can include, for example, a serial port, a parallel port, a game port, and a universal serial bus (USB). Output device(s) 130 may also use the same types of ports as input device(s) 226. Thus, for example, a USB port may be used to provide input to the computer 102 and to output information from the computer 102 to an output device 130.

An output adapter 132 is provided to illustrate that there are some output devices 130 such as a display (e.g., in the form of the touch screen), speakers, and printers, among other output devices 130, which are accessible via the output adapters 132. The output adapters 132 include, by way of illustration and not limitation, video and sound cards that provide a means of connection between the output device 130 and the system bus 108.

It can be noted that some devices and/or systems of devices provide both input and output capabilities. For example, the touch screen of the computer 102 provides both input and output capabilities.

The computer 102 can include logical connections to one or more remote computers, such as remote computer(s) 134. The remote computer(s) 134 may be systems configured with web browsers, PC applications, mobile phone applications, and the like. The remote computer(s) 134 may be personal computers, servers, routers, network PCs, workstations, microprocessor based appliances, peer devices, or the like, and may include many or all of the elements described relative to the computer 102. For purposes of brevity, the remote computer(s) 134 are illustrated with a memory storage device 136. The remote computer(s) 134 are logically connected to the computer 102 through a network interface 138, and physically connected to the computer 102 via a communication connection 140.

Network interface 138 encompasses wired and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 140 refers to the hardware and/or software employed to connect the network interface 138 to the system bus 108. While communication connection 140 is shown for illustrative clarity inside the computer 102, it can also be external to the computer 102. The hardware and/or software for connection to the network interface 138 may include, for example, internal and external technologies such as mobile phone switches, modems including regular telephone grade modems, cable modems and DSL modems, ISDN adapters, and Ethernet cards.

According to embodiments described herein, seven types of behavior features, including stroke time, inter-stroke time, displacement magnitude, displacement direction, pressure, velocity magnitude, and velocity direction, may be extracted from a particular action, e.g., an input of a gesture or personal signature, by a user. However, it is to be understood that embodiments described herein are not limited to these seven behavior features. Rather, any number of alternative or additional behavior features may also be used. As used herein, "pressure" is the force per unit area exerted by the user on the touch screen while performing the action. "Velocity" is a combined measure of speed (i.e., velocity magnitude) and direction (i.e., velocity direction) for performing the action. The "stroke time" of a stroke is the time taken by the user to complete that stroke. The "inter-stroke time" of a pair of strokes is the time taken by the user to start the next stroke after completing the current stroke. During this time, the touch input device, e.g., the user's finger or the touch pen, is not in contact with the touch screen. "Relative stroke displacement" is the displacement between adjacent strokes in the action. "Displacement" is a combined measure of distance (i.e., displacement magnitude) and direction (i.e., displacement direction) between adjacent strokes.

The behavior features may be used to extract information about the actual action performed by the user, as well as the manner in which the action is performed by the user. For example, information about the actual action performed by the user may be provided by the velocity direction, displacement magnitude, and displacement direction for the action. Information about the manner in which the action is performed may be provided by the pressure, velocity magnitude, stroke times, and inter-stroke times for the action.

In various embodiments, appropriate time resolutions at which an action is to be divided into subparts may be determined such that the feature values extracted from the subparts are consistent among different samples of the action. On one hand, if this resolution is too high, the feature values of the same subpart from different samples will not be consistent. On the other hand, if the resolution is too low, the distinctive information from the features is too averaged out to be useful for the authentication procedure. Furthermore, the time resolution may be automatically adjusted for different locations of an action because different locations have consistent feature values at different time resolutions. In various embodiments, the action may be divided into subparts at several time resolutions. Then, for each time resolution, the consistency of feature values extracted from each subpart may be measured among different samples of the action. The resulting coefficient of variation may be used to quantify consistency. All the subparts for which the coefficient of variation is below a certain threshold for a given feature may be selected for extracting the values of the given feature.

In various embodiments, a signature sanitization process may be performed to identify the continuous strokes in a given signature that are to be divided, as well as the appropriate locations to divide the continuous strokes. As used herein, the term "stroke" refers to a continuous movement of a finger, touch pen, or any other suitable type of touch input device on a touch screen during which contact with the screen is not lost. Each user has a typical number of strokes in his signature. However, a user may sometimes join consecutive strokes while doing his signature. Such a combined stroke may be split prior to the extraction of behavior features so that the strokes can be modeled consistently. According to embodiments described herein, statistical techniques based on training data may be used to determine the typical number of strokes in a user's signature. In addition, given a signature, the timing information of strokes from the training data may be used to identify the candidate combined strokes in the signature. From the candidate combined strokes, appropriate combined strokes for splitting may be selected using the timing information of the respective strokes from the training data. A similar process may also be used to identify and split combined strokes in the training data.

In some embodiments, multiple behaviors may be learned from the training samples of a particular action. For example, a user may have multiple ways of performing an action. Therefore, each way that the user may perform the action may be modeled. According to embodiments described herein, least possible minimum variance partitions of feature values may be generated from all the samples of a given subpart such that each partition is consistent. If the number of consistent partitions of a given subpart is below a certain threshold and the number of samples in each partition is above another threshold, each partition may represent a distinct behavior and, thus, may be used in training.

In various embodiments, it may be desirable to identify gestures for a given user that result in a high true positive rate and a low false positive rate. To accomplish this, a user may be requested to provide training data for a number of gestures, e.g., the ten gestures described further with respect to FIG. 2. Machine learning techniques may be used to obtain true positive and false positive rates for each gesture based on the training data. The true positive and false positive rates may then be used to rank the gestures, and the n highest ranked gestures may be used for authentication of the touch screen device. The value of n may be selected by the user, or may be automatically selected by the touch screen device. A larger value of n corresponds to a higher level of security for the touch screen device.

Figure 2:
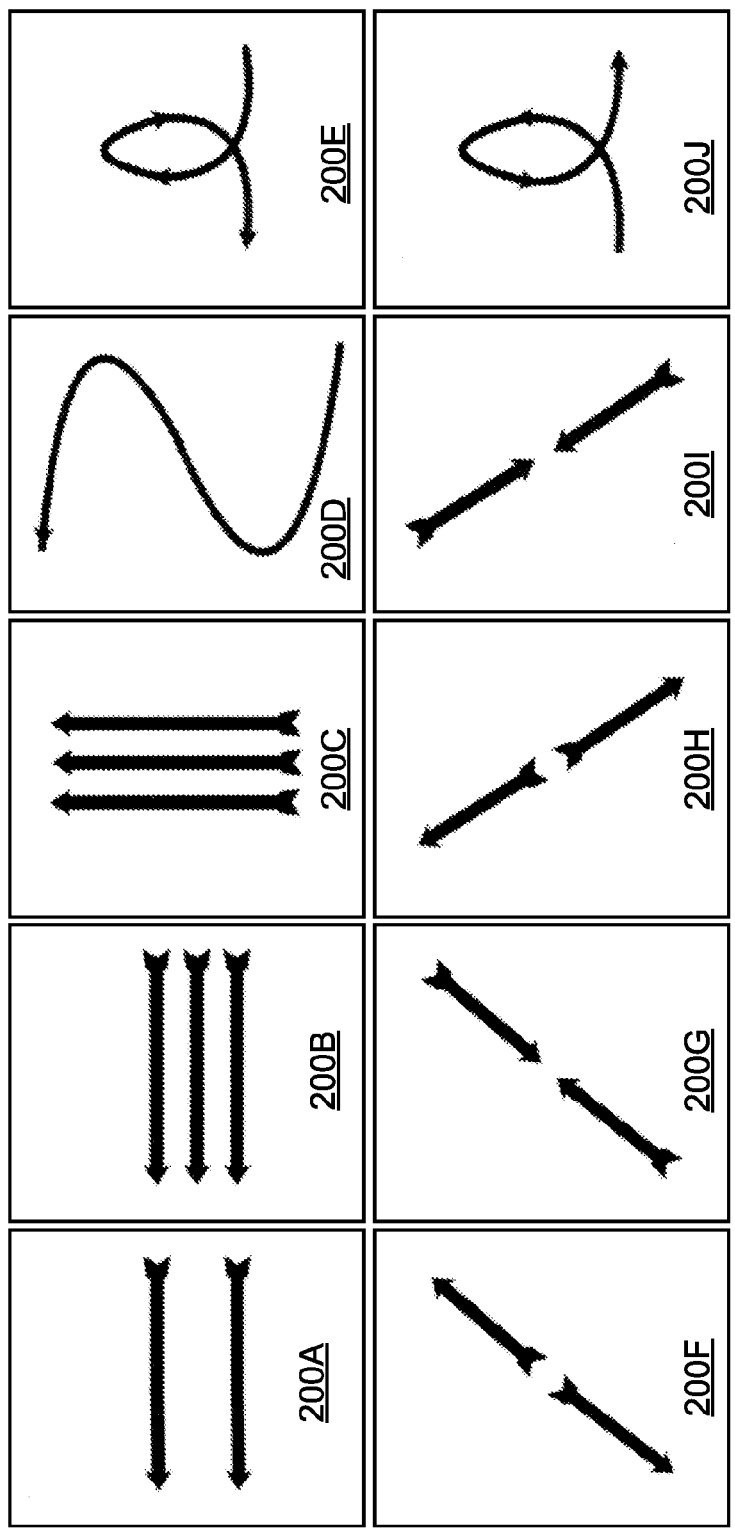
FIG. 2 is a schematic showing ten gestures that may be used according to the behavior based authentication procedure described herein.

FIG. 2 is a schematic showing ten gestures 200A-J that may be used according to the behavior based authentication procedure described herein. As shown in FIG. 2, each gesture 200A-J may indicate the particular position and orientation at which the gesture is to be performed on the touch screen. In addition, each gesture 200A-J may include one or more arrows indicating the number of fingers to be used to perform the gesture 200A-J, as well as the specific direction(s) for performing the gesture 200A-J. For example, a first gesture 200A may include two swipes leftwards on the touch screen using tow fingers, while a third gesture 200C may include three swipes upwards on the touch screen using three fingers.

Figure 3:
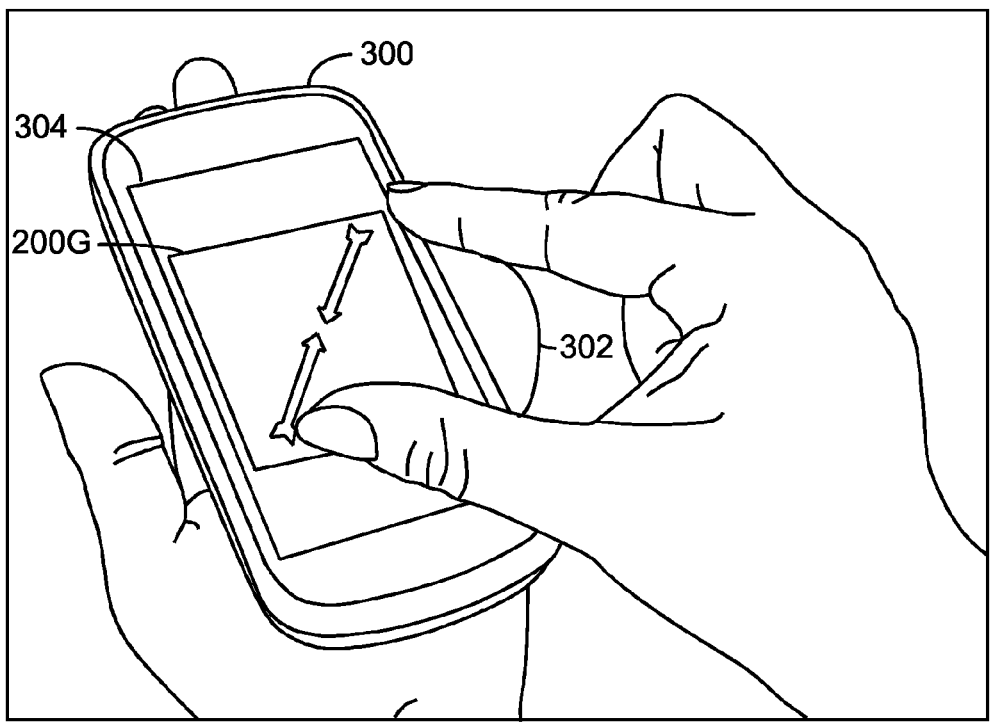
FIG. 3 is a schematic showing an implementation of the behavior based authentication procedure described herein for a mobile phone.

FIG. 3 is a schematic showing an implementation of the behavior based authentication procedure described herein for a mobile phone 300. According to the implementation shown in FIG. 3, the user of the mobile phone 300 may use two fingers 302 to input a gesture, such as the seventh gesture 200G described above with respect to FIG. 2, on a touch screen 304 of the mobile phone 300. Furthermore, the user may input any number of additional gestures, such as any of the gestures 200A-F and 200H-J described with respect to FIG. 2, on the touch screen 304. In various embodiments, behavior features extracted from the input of the gestures 200A-J may then be used to authenticate the user of the mobile phone 300.

Figure 4:
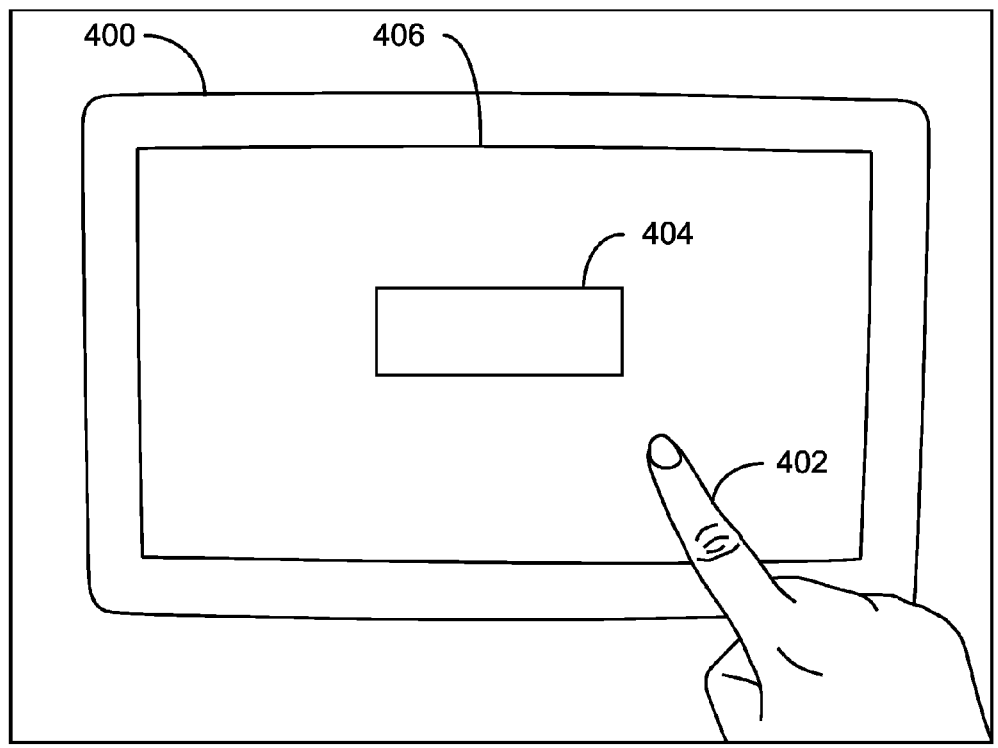
FIG. 4 is a schematic showing an implementation of the behavior based authentication procedure described herein for a tablet computer.

FIG. 4 is a schematic showing an implementation of the behavior based authentication procedure described herein for a tablet computer 400. According to the implementation shown in FIG. 4, the user of the tablet computer 400 uses a finger 402 to input his personal signature into a signature box 404 that is displayed on a touch screen 406 of the tablet computer 400. However, it is to be understood that the user may also input his personal signature into the signature box 404 using a touch pen or other touch input device. In various embodiments, behavior features extracted from the input of the user's personal signature may then be used to authenticate the user of the tablet computer 400.

The behavior based authentication procedure described herein may be implemented by an application (or any suitable type of module including processor executable code) executing on the touch screen device. In various embodiments, while the user of the touch screen device is performing a particular action on the touch screen, the application may sample touch points and log the coordinates of the touch points as well as the time stamp of sampling. The time stamp of the first touch point of the action may be 0, and the time stamps of all subsequent touch points may be measured relative to the first time stamp. The sampling time period for sampling touch points may be defined by the application programming interface (API) of the touch screen device. For example, the sampling time period may be defined as 8 milliseconds (ms) if the touch screen device is a tablet computer, or 18 ms if the touch screen device is a mobile phone. If a touch pen is being used on the touch screen (rather than the user's fingers), the application may also log the pressure exerted by the touch pen on the touch screen for each sampled touch point.

To treat each finger's movements independently in multi-finger gestures, it may be desirable to determine which touch points came from which fingers. To accomplish this, the application may assign a unique identifier to each touch source, e.g., each finger, that is in contact with the touch screen and save the identifier of the touch source along with the coordinates and time stamp for each sampled touch point. In various embodiments, strokes in signatures may be processed separately. Therefore, it may be desirable to determine the times at which a particular stroke starts and ends. To accomplish this, the application may log whether each sampled touch point is the first point when the touch source came in contact with the touch screen, an intermediate point when the touch source moved on the touch screen, or the last point when the touch source lost contact with the touch screen.

For purposes of illustration, the behavior based authentication procedure is described herein with respect to an exemplary data set. The exemplary data set includes data from a number of users. A first portion of the users may perform both signatures and gestures. A second portion of the users may perform only signatures, and the remaining portion of the users may perform only gestures. In addition, a number of users may also act as imposters to replicate the signatures of other users on a tablet computer.

A number of the users may perform signatures on the touch screen of a tablet computer using both a touch pen and their fingers. For each user, at least 100 signature samples may be performed using the touch pen, and at least 100 signature samples may be performed using their fingers. To prevent the users from developing temporary behaviors, which often occurs when the same action is performed many times, the users may be requested to perform no more than 10 signatures at a time before taking a break. Furthermore, a number of the users may perform signatures and gestures on the touch screen of a mobile phone using their fingers. Each user may be provided with a mobile phone executing the application described herein, and may be requested to provide at least 50 samples of signatures and at least 30 samples of each of a number of gestures, e.g., each of the gestures 200A-J described with respect to FIG. 2, over a period of one week.

In various embodiments, two categories of features may be considered. One category includes features that contain information relating to a particular action that was performed (e.g., information about what action was performed), while the other category includes features that contain information relating to the manner in which a particular action was performed (e.g., information about how an action was performed). In some embodiments, the values of seven types of features belonging to these two categories may be used according to embodiments described herein.

As used herein, the term "feature type" (or "type of a feature") is a broad term that encompasses all the features of a particular kind. For example, stroke time is a type of feature. An action with x strokes will have x features of this type.

In the following description, features that contain information relating to the manner in which a particular action was performed, e.g., how features, may be analyzed. The analysis of how features may be used to verify the hypothesis that users have distinct and consistent behaviors for performing actions on touch screens. In addition, features that contain information relating to the particular action that was performed, e.g., what features, may be analyzed. The analysis of what features may be used to show that, for actions that are visually alike, the features from this category are consistent regardless of who performed the actions.

Pressure is the first feature that may be used according to embodiments described herein. Pressure may be considered to be a how feature. Users have distinguishing and consistent pattern of exerting pressure on the touch screen while performing their signatures. Therefore, pressure can be used to model how an action is performed.

Velocity magnitude is the second feature that may be used according to embodiments described herein. Velocity magnitude may be considered to be a how feature. Users have distinguishing and consistent patterns of velocity magnitudes for performing signatures and gestures. More specifically, the time series of velocity magnitudes of samples of an action from the same user are highly consistent and are remarkably different from the time series of velocity magnitudes of samples of an action from a different user. Therefore, velocity magnitude can be used to model how an action is performed.

Stroke time is the third feature that may be used according to embodiments described herein. Stroke time may be considered to be a how feature. Users take a distinguishing and consistent amount of time when performing each stroke in an action. Therefore, stroke times can be used to model how an action is performed.

For signatures, stroke times of an imposter do not lie within the small time range in which the corresponding stroke times of the legitimate user lie. Therefore, the stroke times for signatures may be used to distinguish imposters from legitimate users. For gestures, the distributions of stroke times of users are centered at different means and have a very small overlap. Due to this insignificant overlap, the stroke times for gestures may also be used to distinguish imposters from legitimate users.

Inter-stroke time is the fourth feature that may be used according to embodiments described herein. Inter-stroke time may also be considered to be a how feature. Users generally take a distinguishing and consistent amount of time between consecutive strokes while performing actions on touch screens. Therefore, inter-stroke times can be used to model how an action is performed. More specifically, because inter-stroke times of an imposter typically do not lie within the small time range in which the corresponding inter-stroke times of the legitimate user lie, inter-stroke times may be used to distinguish imposters from legitimate users. In some embodiments, inter-stroke times may be used for signatures and single finger gestures rather than multi-finger gestures because all fingers involved in performing a multi-finger gesture interact with the touch screen approximately simultaneously.

Magnitude of relative stroke displacement (i.e., displacement magnitude) is the fifth feature that may be used according to embodiments described herein. Displacement magnitude may be considered to be both a how feature and a what feature. For multi-finger gestures, users have distinguishing and consistent displacement magnitudes between the centers of consecutive strokes. However, for signatures, although users have consistent displacement magnitudes between the centers of consecutive strokes, the displacement magnitudes are not distinct for legitimate users versus imposters when the signature performed by the imposter looks similar to the original signature. Therefore, the displacement magnitudes can be used to model how a gesture is performed and what signature is performed, but not how a signature is performed.

For gestures, the distributions of displacement magnitudes between consecutive strokes of users are centered at different means and have a small overlap. The overlap is small because the extent to which different users keep their fingers apart while doing multi-finger gestures differs due to the difference in anatomical sizes of their hands, which results in different displacement magnitudes between strokes. Due to the insignificant overlap, displacement magnitudes may be used to distinguish imposters from legitimate users.

For signatures, the displacement magnitudes in a well copied signature by an imposter may lie within the range in which the corresponding displacement magnitudes in the original signature by the legitimate user lie. Therefore, displacement magnitudes may not be used to distinguish between the signatures of legitimate users and imposters. However, displacement magnitudes may be used to determine whether a test signature looks visually similar to the original signature, since signatures that are visually similar will have similar displacement magnitude values.

Velocity phase (i.e., velocity direction) is the sixth feature that may be used according to embodiments described herein. Velocity direction may be considered to be a what feature. Users have consistent patterns of velocity direction in signatures and gestures. However, these patterns may not be used to distinguish between actions of legitimate users and imposters when the action performed by the imposter is visually similar to the action performed by the legitimate user. Therefore, velocity direction may be used to model what action is performed, but not how that action is performed.

Phase of relative stroke displacement (i.e., displacement direction) is the seventh feature that may be used according to embodiments described herein. Displacement direction may also be considered to be a what feature. Users have consistent patterns of displacement direction in signatures and gestures. However, these patterns may not be used to distinguish between the actions of legitimate users and imposters when the action performed by imposter is visually similar to the action performed by the legitimate user. Therefore, displacement direction may be used to model what action is performed, but not how that action is performed.

For signatures, the displacement directions in a well copied signature by an imposter may lie within the range in which the corresponding displacement directions in original signature by a legitimate user lie. Therefore, displacement direction may not be used to distinguish between signatures of legitimate users and imposters. However, the displacement direction may be used to determine whether a test signature is visually similar to the original signature because signatures that look visually similar will have similar displacement direction values. Furthermore, for gestures, the distributions of displacement direction of different users may have considerable overlap. Therefore, displacement direction may not be used to distinguish imposters from legitimate users.

In various embodiments, the seven types of features described herein either allow legitimate users to be distinguished from imposters based on the manner in which legitimate users perform particular actions, or allow a determination to be made regarding whether a particular action that has been performed is the same as the action that was expected. Therefore, the use of the seven types of features in combination may allow for the simultaneous determination of whether an action that was performed is the action that was expected and whether the action was performed by the legitimate user or an imposter.

The behavior based authentication procedure described herein may be used to authenticate a user of a touch screen device based on his behavior of performing a particular action on the touch screen. This may be accomplished using a model of the legitimate user's behavior of performing the particular action. Such a model may be developed using support vector distribution estimation (SVDE).

Figure 5:
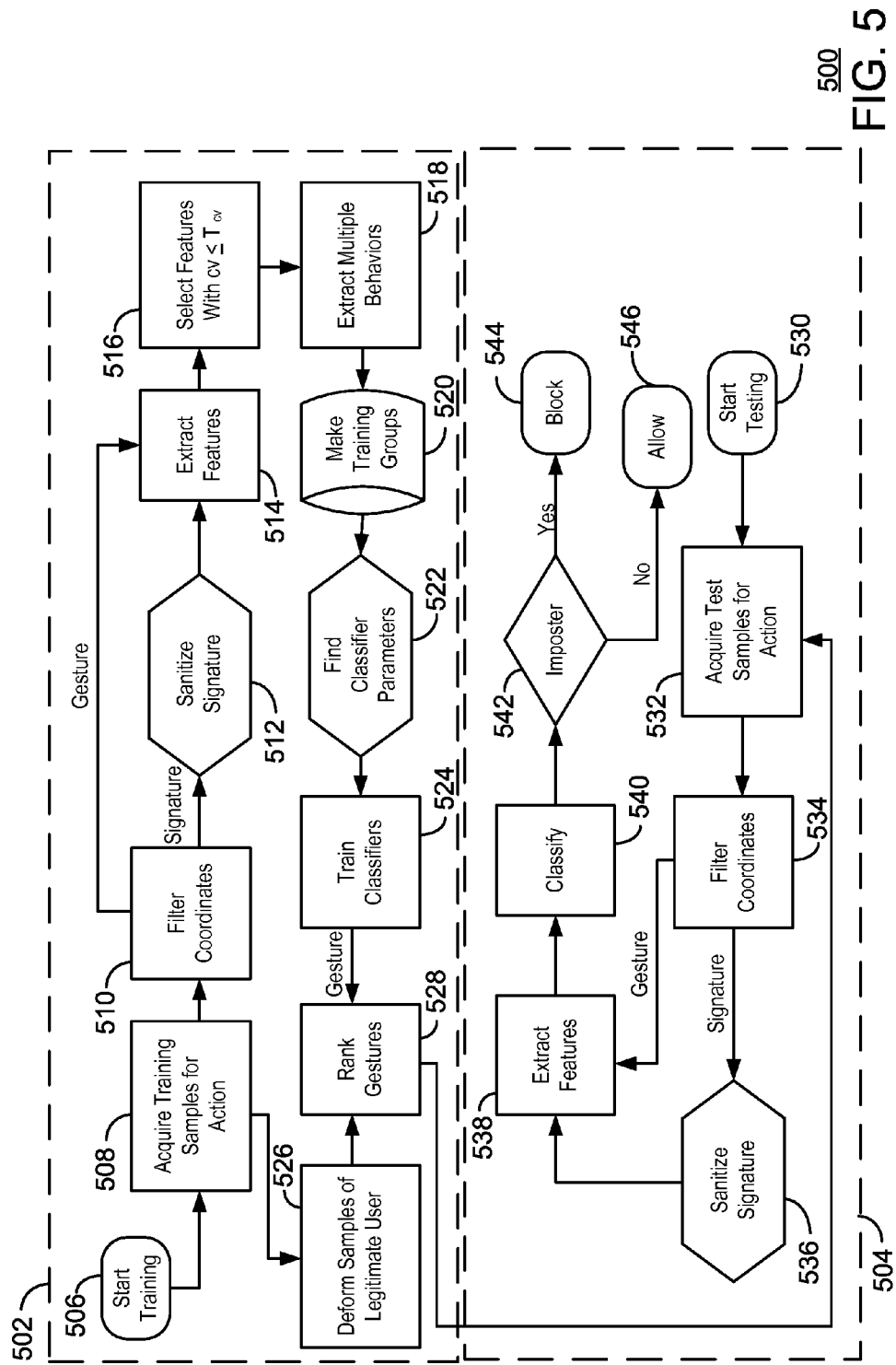
FIG. 5 is a process flow diagram of the behavior based authentication procedure described herein.

FIG. 5 is a process flow diagram of the behavior based authentication procedure 500 described herein. The behavior based authentication procedure 500 may be implemented via a touch screen device or, more specifically, via an application (or any suitable type of module including processor executable code) executing on the touch screen device. In various embodiments, the behavior based authentication procedure includes a training procedure 502 and a testing procedure 504.

The model of the legitimate user's behavior of performing the particular action may be developed in the training procedure 502. The training procedure 502 begins at block 506. At block 508, training samples for the particular action performed by the legitimate user are acquired. Specifically, the legitimate user may be requested to perform the action a specific number of times on the touch screen of the touch screen device. At block 510, the time series of the x-coordinates and the y-coordinates of the action are passed through a filter to remove high frequency noise.

If the action is a signature, the signature is sanitized at block 512. This may involve making the number of strokes for all the training samples in the entire set of training samples equal. At block 514, the values of a number of different types of features, e.g., the seven types of features discussed above, are extracted from the action. To accomplish this, each stroke in the action may be divided into subparts at multiple time resolutions, and the pressure, velocity direction, and velocity magnitude may be extracted from each subpart. The stroke times and inter-stroke times of each stroke may also be determined, as well as the displacement magnitude and displacement direction between the centers of consecutive strokes in the action.

At block 516, features that have consistent values in all training samples are selected by calculating the coefficient of variation for each feature and comparing the coefficient of variation with a threshold. If the coefficient of variation of a feature is below the threshold, i.e., $cv \leq T_{cv}$, the feature may be selected for use in building the model of user behavior.

At block 518, multiple behaviors in all those features for which the coefficients of variation are above the threshold are extracted, and the features are kept for use in building the model. At block 520, the training samples are partitioned into training groups based on the features that were kept for building the model. The training samples may be partitioned such that the training samples in each training group represent a distinct behavior of the user.

At blocks 522 and 524, a model of the user's behavior is built for each training group. The model for each training group is built in the form of an SVDE based classifier trained on the training samples in that training group. In the case of gestures, the user is requested to provide training samples for each of the ten gestures at block 526, and the training procedure 502 is used to build a model of the user's behavior for each gesture. The true positive rate, false positive rate, and accuracy of classification for each gesture are calculated, and the gestures are ranked at block 528 according to any of those three measures (as selected by the user or automatically determined by the touch screen device). This ranking is performed to determine which gesture has the highest classification potential for the user.

Once the model of the user's behavior has been obtained via the training procedure 502, the behavior based authentication procedure 500 proceeds to the testing procedure 504. The testing procedure 504 is used to authenticate the user of the touch screen device.

The testing procedure 504 begins at block 530. At block 532, a test sample for the particular action is acquired. This may be accomplished by requesting the user to perform a signature or to perform n gestures. In various embodiments, the user may specify whether the signature or the gestures are to be used for authentication during the initial setup of the touch screen device. In some embodiments, if gestures are to be used for the testing procedure 504, the user may be requested to perform the n top gestures ranked during the training procedure 502.

At block 534, the time series of the x-coordinates and the y-coordinates of the action are passed through a filter to remove high frequency noise. If the action is a signature, the signature is sanitized at block 536. At block 538, the values of all the features used for training the SVDE based classifiers are extracted.

At block 540, a classification decision on the extracted feature values of a given action is obtained from the trained classifier of each training group. At block 542, it is determined whether the user is an imposter or the legitimate user. In various embodiments, the user is determined to be legitimate if any of the classifiers indicate that the user is legitimate. Further, in the case of gestures, classification decisions may be obtained for all n gestures, and a majority vote on the n decisions may be used to determine whether the user is an imposter or the legitimate user.

If the user is determined to be an imposter, the user may be blocked from accessing the touch screen device at block 544. On the other hand, if the user is determined to be the legitimate user, the user may be allowed to access the touch screen device at block 546.

The process flow diagram of FIG. 5 is not intended to indicate that the blocks of the behavior based authentication procedure 500 are to be executed in any particular order, or that all the blocks shown in FIG. 5 are to be included in the behavior based authentication procedure 500 in every implementation. Further, any number of additional blocks may be included within the behavior based authentication procedure 500, depending on the details of the specific implementation.

As discussed above, the time series of the x-coordinates and the y-coordinates of the logged data points may be passed through a low pass filter to remove any high frequency noise. The time series of the x-coordinates and the y-coordinates of the logged data points may contain high frequency noise due to the finite touch resolution of capacitive touch screens. This high frequency noise may affect the velocity magnitudes and directions. As used herein, the term "high" is relative to the frequency of non-noise components in human actions on touch screens. Specifically, the time series of data points from human actions on touch screens typically contain a majority of their energy in frequencies lower than 20 Hertz (Hz). Therefore, frequencies above 20 Hz may be considered to be high frequencies.

Noise is particularly prominent for actions performed using fingers because capacitive touch screens determine the position of touch by calculating the centroid of the area of the touch screen that is in contact with the finger. When the finger moves on the touch screen, its contact area varies. This results in a change in the centroid value at every instant, which in turn results in another source of noise in addition to finite touch resolution.

In various embodiments, a simple moving average (SMA) filter is used to remove such high frequency noise. The simple moving average (SMA) is the unweighted mean of previous α data points. In some embodiments, the value of α may be set to 15 for time series corresponding to the use of a finger, and the value of α may be set to 10 for time series corresponding to the use of a touch pen.

The combined strokes in a signature sample may be split because features such as stroke time, inter-stroke time, displacement magnitude, and displacement direction depend on the number of strokes in a signature. If the number of strokes in a given signature sample is not consistent with the number of strokes in other signature samples, it may be difficult to relate the values of features from the given signature sample with the values of features from the other signature samples.

Combined strokes occur whenever users do not completely lift their finger or the touch pen from the touch screen between consecutive strokes while doing their signatures. The typical number of strokes in signature of a user may be determined by identifying the strokes with the highest frequency in the training samples for the user's signature. If the number of strokes in a given signature is less than the typical number of strokes for that signature, the signature may be referred to as an "inconsistent signature." On the other hand, if the number of strokes in a given signature is equal to the typical number of strokes for that signature, the signature may be referred to as a "consistent signature." The process of turning an inconsistent signature into a consistent signature may be referred to as "signature sanitization."

To perform signature sanitization, several steps may be performed. First, the next candidate stroke may be identified. The next candidate stroke may be a stroke in the inconsistent signature that is likely to be a combined stroke and, therefore, is to be split. Second, the identified candidate stroke may be split into an appropriate number of strokes. Third, it may be verified that the strokes obtained after splitting the candidate stroke are consistent with the corresponding strokes in the consistent training samples of the signature. These three steps may then be repeated (beginning with the first step) until the inconsistent signature becomes a consistent signature, or until all of the strokes of the inconsistent signatures have been split and the inconsistent signature is still not a consistent signature. In the latter case, the inconsistent signature may be discarded. In various embodiments, this process is used to sanitize all the inconsistent samples in the training samples for the signature. Further, in some embodiments, if the number of strokes in the signature is greater than the typical number of strokes, the signature may simply be discarded without performing signature sanitization.

The following description provides a more detailed explanation of the three steps for signature sanitization. As discussed above, the first step is the identification of the next candidate stroke. In this first step, the strokes in the inconsistent signature are sequentially scanned starting with the first stroke to identify candidate strokes. Let $n_t$ be the typical number of strokes in the consistent training samples for a given signature, and let $n_{ic}$ be the number of strokes in the inconsistent training sample, where $n_{ic} < n_t$. To determine whether a stroke i of the inconsistent training sample is a candidate stroke, the stroke time of stroke i may be compared with the sum of stroke times and inter-stroke times of l+1 consecutive strokes, starting from stroke i up to stroke i+l, of the consistent training samples for the signature. The value of l lies in the range $[0, n_t-n_c]$. If it is determined that the stroke time of the particular stroke of the inconsistent signature is close enough to the sum of stroke times and inter-stroke times of c consecutive strokes in the consistent training samples for the signature, the stroke may be identified as the candidate stroke. The signature sanitization may then proceed to the next step of splitting the candidate stroke. If no candidate strokes are found (which could be because the signature was performed by an imposter or because the signature is not visually similar to the consistent signatures, for example), the inconsistent signature may be discarded.

To formally describe how the stroke time of stroke i is compared with the sum of stroke times and inter-stroke times of l+1 consecutive strokes, i.e., strokes i to i+l, the following notations may be used. Let N be the number of training samples of the given signature. Without loss of generality, it may be assumed that all N training samples are consistent. Let $^{ic}t_i$ be the stroke time of a stroke i (where $1 \leq i \leq n_{ic}$) in the inconsistent signature, and let $^{ic}\hat{t}_i$ be the inter-stroke time between strokes i and i+1 in the inconsistent signature. Similarly, let $t_{t_i}[j]$ be the stroke time of a stroke i (where $1 \leq i \leq n_t$) in jth consistent training sample (where $1 \leq j \leq N$) of the signature, and let $\hat{t}_{t_i}[j]$ be the inter-stroke time between strokes i and i+1 in the jth consistent training sample of the signature. Let $\mu_i$ and $\hat{\mu}_i$ be respectively the means of stroke times of stroke i and inter-stroke times between strokes i and i+1 among the N consistent training samples of the signature, as defined below in Eq. (1).

$$\mu_i = \sum_{j=1}^{N} \frac{t_{t_i}[j]}{N}, \hat{\mu}_i = \sum_{j=1}^{N} \frac{\hat{t}_{t_i}[j]}{N} \qquad (1)$$

Let Cov(i,k) be the covariance between samples of stroke time of stroke i and samples of stroke time of stroke k from the N consistent training samples for the signature. Formally, Cov(i,k) may be defined as shown below in Eq. (2).

$$\text{Cov}(i, k) = \sum_{j=1}^{N} \frac{(t_{t_i}[j]-\mu_i)(t_{t_k}[j]-\mu_k)}{N} \qquad (2)$$

Similarly, let Côv(i,k) be the covariance between samples of inter-stroke time between strokes i and i+1 and samples of inter-stroke time of strokes k and k+1 from the N consistent training samples for the signature. Formally, Côv(i,k) may be defined as shown below in Eq. (3).

$$\text{Côv}(i, k) = \sum_{j=1}^{N} \frac{(\hat{t}_{t_i}[j]-\hat{\mu}_i)(\hat{t}_{t_k}[j]-\hat{\mu}_k)}{N} \qquad (3)$$

Let $\overline{\text{Cov}}(i,k)$ be the covariance between samples of stroke time of stroke i and samples of inter-stroke time of strokes k and k+1 from the N consistent training samples for the signature. Formally, $\overline{\text{Cov}}(i,k)$ may be defined as shown below in Eq. (4).

$$\overline{\text{Cov}}(i, k) = \sum_{j=1}^{N} \frac{(t_{i_i[j]} - \hat{\mu}_i)(t_{i_k[j]} - \hat{\mu}_k)}{N} \quad (4)$$

Let $\mu_{il}$, $\sigma_{il}$, and $cv_{il}$ be the mean, standard deviation, and coefficient of variation, respectively, of the sum of stroke times of strokes i to i+l and inter-stroke times between these l+1 strokes in the N consistent training samples for the signature. Formally, $\mu_{il}$, $\sigma_{il}$, and $cv_{il}$ may be defined according to Eqs. (5)-(7).

$$\mu_{il} = \sum_{x=i}^{i+l} \mu_x + \sum_{x=i}^{i+l-1} \hat{\mu}_x \quad (5)$$

$$\sigma_{il} = \sqrt{\sum_{x=i}^{i+l}\sum_{y=i}^{i+l} \text{Cov}(x,y) + \sum_{x=i}^{i+l-1}\sum_{y=i}^{i+l-1} \hat{\text{Cov}}(x,y) + \sum_{x=i}^{i+l}\sum_{y=i}^{i+l-1} \overline{\text{Cov}}(x,y)} \quad (6)$$

$$cv_{il} = \frac{\sigma_{il}}{\mu_{il}} \quad (7)$$

To determine whether a stoke i of the inconsistent signature is a combination of strokes i to i+l of the consistent signature, the mean $\mu_{il}$ and standard deviation $\sigma_{il}$ of the sum of stroke times of strokes i to i+l and inter-stroke times between these l+1 strokes of the N consistent training samples for the signature may be calculated. Second, it may be determined whether the stroke time $^{ic}t_i$ of this stroke i of the inconsistent signature lies within a constant factor c of $cv_{il}$ times $\sigma_{il}$ on either side of $\mu_{il}$. If it does, there is a possibility that this stroke i of the inconsistent signature is a combination of strokes i to i+l of the consistent signature. Therefore, the stroke i of the inconsistent signature may be identified as a candidate stroke. The purpose of multiplying $cv_{il}$ with $\sigma_{il}$ is to scale the range around $\mu_{il}$, in which $^{ic}t_i$ can lie, according to the extent of variation in the values of the sum of stroke times of strokes i to i+l and inter-stroke times between these l+1 strokes of the N consistent training samples for the signature. If the variation is large (or small), it may be desirable to allow for a larger (or smaller) range around $\mu_{il}$ in which $^{ic}t_i$ can lie. This is automatically accomplished using $cv_{il}$.

Formally, a stroke i may be identified as a candidate stroke if its stroke time $^{ic}t_i$ satisfies the condition shown below in Eq. (8).

$$\mu_{il} - c \times cv_{il} \times \sigma_{il} \leq {}^{ic}t_i \leq \mu_{il} + c \times cv_{il} \times \sigma_{il} \quad (8)$$

As discussed above, the second step in signature sanitization is splitting combined strokes. The candidate stroke i may be split into l+1 strokes corresponding to the strokes i to i+l of consistent training samples of the signature. This may be accomplished by removing those parts from the candidate stroke that are not present in typical signatures. Specifically, the means of stroke times of strokes i to i+l (i.e., $\mu_i$ to $\mu_{i+l}$) and means of inter-stroke times between these l+1 strokes (i.e., $\hat{\mu}_i$ to $\hat{\mu}_{i+l-1}$) may be calculated from the N consistent training samples for the signature. The l portions of the candidate stroke i whose times correspond to the l mean inter-stroke times (i.e., $\hat{\mu}_i$ to $\hat{\mu}_{i+l-1}$) of the consistent signatures may then be removed. This may result in the splitting of the candidate stroke into the desired l+1 strokes.

To formally explain which l portions of candidate stroke i are to be removed, the instantaneous time of drawing the coordinate stoke i may be represented by t, where $0 \leq t \leq {}^{ic}t_i$. All the points from the signature for which the instantaneous time satisfies the condition shown below in Eq. (9) may be removed.

$$\frac{\mu_{i+k} + \sum_{x=i}^{i+k-1}(\mu_x + \bar{\mu}_x)}{\mu_{il}} \times {}^c t_i < t < \frac{\sum_{x=i}^{i+k}(\mu_x + \bar{\mu}_x)}{\mu_{il}} \times {}^c t_i \quad (9)$$

In Eq. (9), 0<k<l. The numerator in the fraction on the left hand side of Eq. (9) represents the sum of average stroke times of strokes i to i+k and inter-stroke times between these k+1 strokes in the consistent training samples. The numerator in the fraction on the right hand side of Eq. (9) represents the sum of average stroke times of strokes i to i+k and k+1 average inter-stroke times between strokes i to i+k+1. The denominator in both of the fractions of Eq. (9) is the sum of average stroke times of strokes i to i+l and the inter-stroke times between these l+1 strokes. The left hand side of Eq. (9) calculates the value of instantaneous time at which the contact between the touch input device and the touch screen is to have been removed by the user to end stroke number i+k, while the right hand side of Eq. (9) calculates the value of the instantaneous time at which the contact between the touch input device and the touch screen is to have been reestablished by the user to start stroke number i+k+1 (which the user did not do, resulting in a combined stroke). Therefore, all the data points for which the instantaneous time satisfies the condition in Eq. (9) may be removed from the candidate stroke i, and l+1 strokes may be generated from the candidate stroke.

As discussed above, the third step of signature sanitization is verification. It may be verified whether the stroke times of the l+1 strokes obtained by splitting the candidate stroke i are consistent with the stroke times of the corresponding strokes in the consistent training samples for the signature. If verified, the strokes resulting from splitting the candidate stroke may be kept. Otherwise, the strokes may be discarded, and the candidate stroke may remain as is. It may then be determined whether either of the stopping conditions has been met. If neither stopping condition has been met, the signature sanitization may begin searching for the next candidate stroke at the first step.

To verify that the stroke times of the l+1 new strokes are consistent with the stroke times of the corresponding strokes in the consistent training samples, the means $\mu_x$ and standard deviations $\sigma_x$ ($=\sqrt{\text{Cov}(x,x)}$) of the stroke times of each of the corresponding l+1 strokes (i.e., $\forall x \in [i, i+l]$) in the consistent training samples for the signature may be calculated. Second, it may be determined whether the time $^s t_x$ of each new stroke obtained after splitting the candidate stroke lies within a constant factor c of $cv_x$ times $\sigma_x$ on either sides of $\mu_x$, where $cv_x$ is the coefficient of variation of the stroke times of stroke x in the consistent training samples for the signature and is given by $cv_x = \sigma_x / \mu_x$. The intuition of multiplying $cv_x$ with $\sigma_x$ is the same as that of multiplying $cv_{il}$ with $\sigma_{il}$ according to Eq. (8). If $\forall x \in [i, i+l]$, ${}^s t_x$ lies within this range. The signature sanitization may then be considered to be correct, and the split strokes may be kept. Formally, the signature sanitization may be considered to be correct if the condition shown below in Eq. (10) holds for all split strokes.

$$\mu_x - c \times cv_x \times \sigma_x \leq {}^s t_x \leq \mu_x + c \times cv_x \times \sigma_x \qquad (10)$$

Pseudocode that may be used to perform signature sanitization is shown below.

```
Input:   (1) Inconsistent signature sample S with n_c strokes
         (2) N consistent training samples with n_t strokes each
Output:  (1) Sanitization status F_S ∈ {True, False}
         (2) Resulting signature after sanitization S'
S' ← S
for i:= 1 to n_c do
    F_v ← false
    for l:= 0 to n_t - n_c do
        if ^rc t_1 satisfies Eq. (8) then
            for k:= 0 to l - 1 do
                Remove data points for which t satisfies Eq. (9)
            end
            for x:= i to i + l do
                F_v ← true
                if ^s t_x does not satisfy Eq. (10) then
                    F_v ← false
                    Break innermost for loop
                end
            end
        end
        if F_v is true then
            Replace candidate stroke i with i + 1 strokes in S'
            n_c ← n_c + 1
            i = i + l + 1
            Break innermost for loop
        end
        else
            Keep candidate stroke i in S'
        end
    end
    if n_c = = n_t then
        F_S ← true
        return (F_s, S')
    end
end
F_S ← false
S' ← S
return (F_s, S')
```

The following description provides a detailed explanation of the manner in which the values of the seven types of features are extracted, as well as the manner in which appropriate features for building the model of the user's behavior are selected using SVDE based classifiers. In various embodiments, "stroke based features," which may include stroke time, inter-stroke time, displacement magnitude, and displacement direction, as well as "sub-stroke based features," which may include velocity magnitude, velocity direction, and device acceleration (or pressure), are extracted from training samples for the action.

In some embodiments, to extract the stroke time of a stroke based on the time stamps of touch points, the time duration between the time of the first touch point and the time of the last touch point for the stroke is calculated. To extract the inter-stroke time between two consecutive strokes in an action based on the time stamps of the touch points, the time duration between the time of the first touch point of the first stroke and the time of the first touch point of the second stroke may be calculated. In various embodiments, the inter-stroke times between all pairs of consecutive strokes in an action are calculated. To extract the stroke displacement magnitude between any two strokes in an action, the Euclidean distance between the centers of the two bounding boxes of the two strokes may be calculated. A bounding box of a stroke is the smallest rectangle that contains the stroke. To extract stroke displacement direction between any two strokes in an action, the arc-tangent of the ratio of the magnitudes of the vertical component and the horizontal component of the stroke displacement vector directed from the center of one bounding box to the center of the other bounding box may be calculated. In various embodiments, the stroke displacement magnitude and stroke displacement direction are calculated from all pairs of strokes in an action.

Given N training samples, for each feature element, all N values may be partitioned into the least number of minimum variance partitions, where the coefficient of variation for each partition is below a threshold. Let $P_k$ represent a partitioning of N values of a feature element into k partitions. Let $Q_k$ represent a different partitioning of N values of the same feature element into k partitions. Let $\sigma_i^2(P_k)$ represent the variance of values in partition i of partitioning $P_x$, where $1 \leq i \leq k$. Let $\sigma_i^2(Q_k)$ represent the variance of values in partition i of partitioning $Q_k$. Partitioning $P_k$ is the minimum variance partitions if and only if the condition shown below in Eq. (11) holds for any $Q_k$.

$$\max_i(\sigma_i^2(P_k)) \leq \max_i(\sigma_i^2(Q_k)) \qquad (11)$$

To find the least number of minimum variance partitions for which the coefficient of variation is below the threshold, the number of minimum variance partitions may be increased starting from 1 until the coefficient of variation is below the threshold. To obtain k minimum variance partitions, where $1 \leq k \leq N$, agglomerative hierarchical clustering may be used with Ward's method. Ward's method may allow for the determination of any number of partitions by cutting the dendrogram built by agglomerative hierarchical clustering at an appropriate level.

After the least number of minimum variance partitions for which the coefficient of variation for each partition is below the threshold has been found, a determination may be made about whether to select the feature element. If the least number of minimum variance partitions is less than or equal to the number of postures for which the training samples were obtained, the feature element may be selected. Otherwise, the feature element may be discarded. Note that, if the number of postures for which the training samples were obtained is unknown, the number of postures may be assumed to be equal to 1.

As discussed above, sub-stroke based features may include velocity magnitude, velocity direction, and device acceleration. To extract values for these features, each stroke may be segmented into sub-strokes. Each stroke may be segmented into sub-strokes because, at different segments of a stroke, the speed and direction of movement of the finger often varies. In addition, at different segments of a stroke, the acceleration of the device often varies.

It may be desirable to segment a stroke into sub-strokes such that the velocity magnitude, velocity direction, and device acceleration information measured at each sub-stroke characterizes the distinguishing behaviors of the user who performed the stroke. Given N strokes performed by one user and the appropriate time duration p as the segmentation guideline, each stroke may be segmented into the same number of segments such that, for each stroke, the same number of feature elements is obtained. However, because different strokes have different time durations, segmenting each stroke into sub-strokes of time duration p may not result in the same number of segments for each stroke. To address this issue, the value of $$\left\lceil \frac{t}{p} \right\rceil$$

may be calculated for each stroke, where t is the time duration of the stroke. From the resulting N values, the most frequent value, denoted s, may be used as the number of sub-strokes into which each stroke is to be segmented. Finally, each stroke may be segmented into s sub-strokes, where each sub-stroke has the same time duration.

After segmenting all strokes into sub-strokes, the velocity magnitude, velocity direction, and device acceleration may be extracted from each sub-stroke. To calculate velocity magnitude and direction, the coordinates of the starting and ending points of the sub-stroke may be obtained. However, the starting and ending points of a sub-stroke, which is segmented from a stroke based on time duration, often do not lie exactly on touch points reported by the touch screen device. The coordinates from any end point that lies between two consecutive touch points reported by the touch screen device may be calculated by interpolating between these two touch points. Let $(x_i, y_i)$ be the coordinates of a touch point with time stamp $t_i$, and let $(x_{i+1}, y_{i+1})$ be the coordinates of the adjacent touch point with time stamp $t_{i+1}$. Suppose the time stamp of an end point is equal to t, where $t_i < t < t_{i+1}$. The coordinates (x,y) of the end point may then be calculated based on the straight line between $(x_i, y_i)$ and $(x_{i+1}, y_{i+1})$, as shown below in Eqs. (12) and (13).

$$x = \frac{(t - t_i)}{(t_{i+1} - t_i)} \times (x_{i-1} - x_i) + x_i \quad (12)$$

$$y = \frac{(t - t_i)}{(t_{i+1} - t_i)} \times (y_{i+1} - y_i) + y_i \quad (13)$$

The velocity magnitude of each sub-stroke may be extracted by calculating the Euclidean distance between the starting and ending points of the sub-stroke divided by the time duration of the sub-stroke. The velocity direction of each sub-stroke may be extracted by calculating the arc-tangent of the ratio of the magnitudes of the vertical component and the horizontal component of the velocity vector directed from the starting point to the ending point of the sub-stroke. In addition, the device acceleration during each sub-stroke may be extracted by averaging the device acceleration values reported by the touch screen device at each touch point in that sub-stroke in all three directions, with the device being the origin.

In some embodiments, it may be desirable to determine an appropriate sub-stroke time duration. On one hand, when the sub-stroke time duration is too small, the behavior information extracted from each sub-stroke of the same user may become inconsistent because, when feature values become instantaneous, they are unlikely to be consistent for the same user. On the other hand, when the sub-stroke time duration is too large, the behavior information extracted from each sub-stroke of different users may become similar because the unique dynamics of individual users may not be distinguishable. Therefore, it may be desirable to determine a suitable trade-off between consistency and distinguishability when determining an appropriate sub-stroke time duration.

In order to determine an appropriate sub-stroke time duration, a metric referred to as "consistency factor" may be defined. Given a set of samples of the same stroke, which are segmented using time duration p as the guideline, let m be the number of sub-strokes, and let c be the number of sub-strokes that have the consistent behavior for a particular feature. The consistency factor of this set of samples under time duration p may be defined as c/m. For simplicity, the term "combined consistency factor" may be used to refer to the consistency factor of the set of all samples of the same stroke from all users, and the term "individual consistency factor" may be used to refer to the mean consistency factor of the set of all samples of the same stroke from the same user. In various embodiments, the individual consistency factors typically increases as the sub-stroke time duration p is increased. In addition, the combined consistency factor typically decreases when p is in the range from about 30 ms to 60 ms. These observations are also true for measurements relating to velocity magnitude, velocity direction, and device acceleration. Therefore, when the sub-stroke time duration is between 30 ms and 60 ms, users may have distinguishing behaviors for the features of velocity magnitude, velocity direction, and device acceleration.

So far, it has been assumed that all sub-strokes segmented from a stroke have the same time duration. However, in reality, users have consistent and distinguishing behavior for sub-strokes of different time durations. Therefore, it may be desirable to find such sub-strokes of different time durations. The entire time duration of a stroke may be represented as a line with the initial color of white. Given a set of samples of a stroke performed by one user under b postures, the stroke may be segmented with the time duration p=60 ms and the number of minimum variance partition k=1. For each resulting sub-stroke, the coefficient of variation of the feature values extracted from the sub-stroke may be measured. If the coefficient of variation is lower than the threshold, the sub-stroke with k minimum variance partitions may be chosen as a feature element, and the sub-stroke may be colored in the line as black. After this round of segmentation, if there are any white sub-strokes, the next round of segmentation may be performed on the entire stroke with p=55 ms and the number of minimum variance partition k still being 1. In this round, the coefficient of variation may be measured for any sub-stroke whose color is completely white. If the coefficient of variation is lower than the threshold, the sub-stroke with k minimum variance partitions may be chosen as a feature element, and the sub-stroke may be colored in the line as black. This process may be continued by decrementing the time duration p by 5 ms in each round until there are no white regions of length larger than or equal to 30 ms left in the line, or until p is decremented to 30 ms. If p is decremented to be 30 ms and there are still white regions of length larger than or equal to 30 ms, k may be increased by 1, and p may be reset to 60 ms. The process may then be repeated. The last possible round may be with k set to a value of b and p set to 30 ms. The whole process may terminate when there are no white regions of length larger than or equal to 30 ms.

Pseudocode that may be used for the extraction and selection of features is shown below.

```
Input:   (1) N training samples of action with n_r strokes each
         (2) Number of postures B
         (3) Threshold T_cv
Output:  (1) An N × F array, O_fv, containing N extracted feature vectors,
             each with F extracted and selected feature elements
         (2) An N × F array, O_Bld, containing the behavior ID of each
             value in O_fv
idx ← 1; Q ← [0]_{N×4×nt}
for f ∈ {stroke times, inter-stroke times, stroke disp mag, stroke disp
dir} do
   for j: = 1 to N do
      for i: = 1 to n_r do
         Q[j, f, i] ← Extract feature type f from stroke i of sample j
      end
   end
end
for f ∈ {stroke times, inter-stroke times, stroke disp mag, stroke disp
dir} do
   for i: = 1 to n_r do
      [k̄, Blds, Flag] ← ExtractBehaviors(Q[1: N, f, i], T_cv, b)
      if Flag == true then
         O_fv[1: N, idx] ← Q[1: N, f, i]
         O_Bld[1: N, idx] ← Blds
         idx ← idx + 1
      end
   end
end
Q ← [0]_{N×1}
for f ∈ {velocity mag, velocity dir, device acc} do
   for i := 1 to n_r do
      Color the stroke white
      for k := 1 to b do
         for p := 60 ms to 30 ms step − 5 ms do
            s = getNumSubStrokes(N samples of stroke i, p)
            for q: = 1 to s do
               if sub-stroke q is completely white then
                  Q ← Extract feature type f from N samples of sub-strokes
q
                  [k̄, Blds, Flag] ←ExtractBehaviors(Q, T_cv, k)
                  if Flag = true && k̄ == k then
                     O_fv[1: N, idx] ← Q
                     O_Bld[1: N, idx] ← Blds
                     idx ← idx + 1
                     Color sub-stroke q black
                     if stroke does not have a white region larger than or
                     equal to 30 ms then
                        return O_fv, O_Bld
                     end
                  end
               end
            end
         end
      end
   end
end
return O_fv, O_Bld
ExtractBehaviors
Input:   (1) R_{N×1}, N values of a feature element
         (2) Threshold T_cv
         (3) b, maximum allowed number of minimum variance partitions
Output:  (1) k, number of minimum variance partitions made
         (2) Blds, contains behavior ID of each value in R
         (3) Flag, status of making minimum variance partitions
for k = 1 to b do
   Blds = Assign clusternumber to each element in R using Ward's
   method, where 1 ≤ clusternumber ≤ k
   Flag ← true
   for z = 1 to k do
      if cv of values in cluster z > T_cv then
         Flag ← false
         Break innermost for loop
      end
   end
   if Flag == true then
      return k, Blds, Flag
   end
end
return NULL. NULL, false
getNumSubStrokes
Input:   (1) N samples of stroke i
         (2) p, time duration for making sub-strokes
```

```
Output:  (1) number of strokes
maxSS ← max_j(ceil(stroke time of sample j/p))
minSS ← min_j(ceil(stroke time of sample j/p))
hist ← [0]_{1×maxSS−minSS+1}
F ← [0]_{1×_max−_min+1}
for j: = 1 to N do
   idx_{hist} ← ceil(stroke time of stroke j/p) − minSS + 1
   hist[idx_{hist}] ← hist[idx_{hist}] + 1
end
return max_l(hist[l])
```

Once the features to be used in training the classifiers have been determined, the values of the features may be arranged to make training instances for each sample of the action. For each sample of the action, the selected stroke times (i.e., stroke times with no more than B behaviors) of the strokes in the sample may be determined first, followed by the selected inter-stroke times, the displacement magnitudes, and the displacement directions. The pressure values from all x-consistent ($\forall x \in [1, B]$) subparts made for pressure may be determined next, followed by the velocity magnitudes and the velocity directions for their own x-consistent subparts. Note that different numbers of x-consistent subparts may be determined for the pressure, the velocity magnitude, and the velocity direction. Also note that, in all training instances, the feature at location i is extracted from the same (sub)part of all training samples of the action.

In various embodiments, the training instances may be partitioned into training groups representing different behaviors of the user. The behaviors of the user may be modeled for each training group using SVDE based classifiers. An unseen sample of the action may then be classified using the user behavior models. Specifically, a user corresponding to the unseen sample may be classified as either a legitimate user or an imposter. This entire process is discussed in more detail below.

The training instances may be partitioned into training groups such that any given feature in the training instances of a given training group has exactly one behavior. Thus, each training group may represent exactly one distinct behavior of the user when performing the action. Such training groups may allow each behavior of the user to be modeled separately.

As discussed above, agglomerative hierarchical clustering is performed for each of the features in the training instances. Therefore, the number of behaviors for each feature in the training instances is already known, as well as the behavior to which each value of a given feature belongs. Using this information, the training groups may be generated by simply grouping together the training instances in which the value of each feature represents the same behavior. The training groups for which the number of training instances is below a threshold, $T_{tg}$, may be discarded because such training groups do not have enough information to correctly model the user behavior. In some embodiments, $T_{tg}$ may be set to 20.

In real world deployments, training samples are typically only available from the legitimate user. When training samples are available only from one class (i.e., the legitimate user) but test samples are available from two classes (i.e., the legitimate user and imposters), support vector distribution estimation (SVDE) may be used to model the training samples obtained from the one class. The model(s) may then be used to classify the test samples obtained from the two classes. In some embodiments, the open source implementation of SVDE may be used to model the behaviors of a user and classify unseen test samples. In addition, each training group may be processed separately when modeling the user behaviors.

The values of each feature in the training instances may be scaled such that the values are within the range [0, 1]. This may prevent features in greater numeric ranges from dominating features in smaller numeric ranges. Appropriate values for $\gamma$, a parameter for radial basis function (RBF) kernel, and $v$, a parameter for SVDE, may then be found. The appropriate values of $\gamma$ and $v$ may be determined by performing a grid search on the ranges $2^{-17} \leq \gamma \leq 2^0$ and $2^{-10} \leq v \leq 2^0$ with 10-fold cross validation on the training instances in the training group being processed.

As the training instances are only from one class (i.e., the legitimate user), cross validation during grid search only measures the true positive (TP) rate. In various embodiments, the TP rate may be different for different values of parameters, and there may be a region on a surface resulting from the grid search where the TP rate is particularly high. Selecting parameter values with higher TP rates increases the likelihood that false positives (FP) will be obtained, while selecting parameter values with lower TP rate can become a source of nuisance due to greater rejections of the legitimate user.

Once a TP rate has been selected, the coordinates of the points on the contour of the TP rate on the surface resulting from the grid search may be obtained. From the points on this contour, $z$ points may be randomly selected, where each of the $z$ points provides a pair of values of $\gamma$ and $v$. For each of the $z$ pairs of parameter values, an SVDE classifier may be trained using the training instances from the current training group. Therefore, for each training group, an ensemble of $z$ parallel models may be obtained. The ensemble of $z$ parallel models may then be used to classify any unseen test sample.

The following pseudocode may be used to train SVDE classifiers to generate a model of user behavior.

```
Input:   (1) O_fv, containing selected feature values for each training
             sample
         (2) O_Bld, containing the behaviors IDs of each value in O_fv
         (3) Required true positive rate, TP
         (4) Classifiers in ensemble, z
         (5) Minimum number of samples required to make training
             groups, T_tg
Output:  (1) Set E of ensembles of classifiers
TG ← Set of training groups made from instances in O_fv using O_Bld
E ← φ
for i := 1 to |TG| do
    if |TG[i]| ≥ T_tg then
        Scale the values of all features in the range [0, 1] for γ :=
        2^-17 to 2^0 do
            for v := 2^-10 to 2^0 do
                G [γ, v] ← Calculate true positive rate using 10-fold cross
                validation for parameter values γ and v
            end
        end
        Z ← z random points from contour of G with true positive rate TP
        for z := 1 to |Z| do
            e[z] ← Train classifier with coordinates of z on TG[i]
        end
        E ← E ∪ e
    end
end
return E
```

To classify an unseen test sample of the action, a test instance that has the same set of features as the set of features in each training instance may be generated. The value of each feature in this test instance may be extracted from the same (sub)part of the test sample as the (sub)part of the training sample from which the value of the corresponding feature in a training instance was extracted. To determine whether the unseen test sample is from the legitimate user or an imposter, a classification decision for the unseen test instance may be obtained from each ensemble of classifiers corresponding to each training group. If any of the ensembles declare the unseen test sample to be from the legitimate user, the user corresponding to the unseen test sample may be declared to be the legitimate user. However, if none of the ensembles declare the test sample to be from the legitimate user, the user corresponding to the unseen test sample may be declared to be an imposter.

The following pseudocode may be used to classify a user corresponding to a specific test sample as either a legitimate user or an imposter.

```
Input:   (1) Test Sample
         (2) E, the ensemble of classifiers
         (3) Information about which (sub)parts to extract features from
             and how to arrange the features
         (4) Information about scaling factor
Output:  (1) Decision D ∈ {Legitimate, Imposter}
Extract, arrange, and scale features from test sample using information
of (sub)parts, arrangement, and scaling from training
for ∀e ∈ E do
    D ← Evaluate test instance with ensemble e
    if D == Legitimate then
        Break for loop
    end
end
return D
```

In various embodiments, if the user corresponding to the unseen test sample is declared to be the legitimate user, the user may be allowed to access the touch screen device on which the action was performed. For example, the action performed by the user may satisfy the lock function on the touch screen device, and, thus, the touch screen device may be unlocked. However, if user corresponding to the unseen test sample is declared to be an imposter, the user may not be allowed to access the touch screen device on which the action was performed. For example, the action performed by the user may not satisfy the lock function on the touch screen device, and, thus, the touch screen device may not be unlocked.

Figure 6:
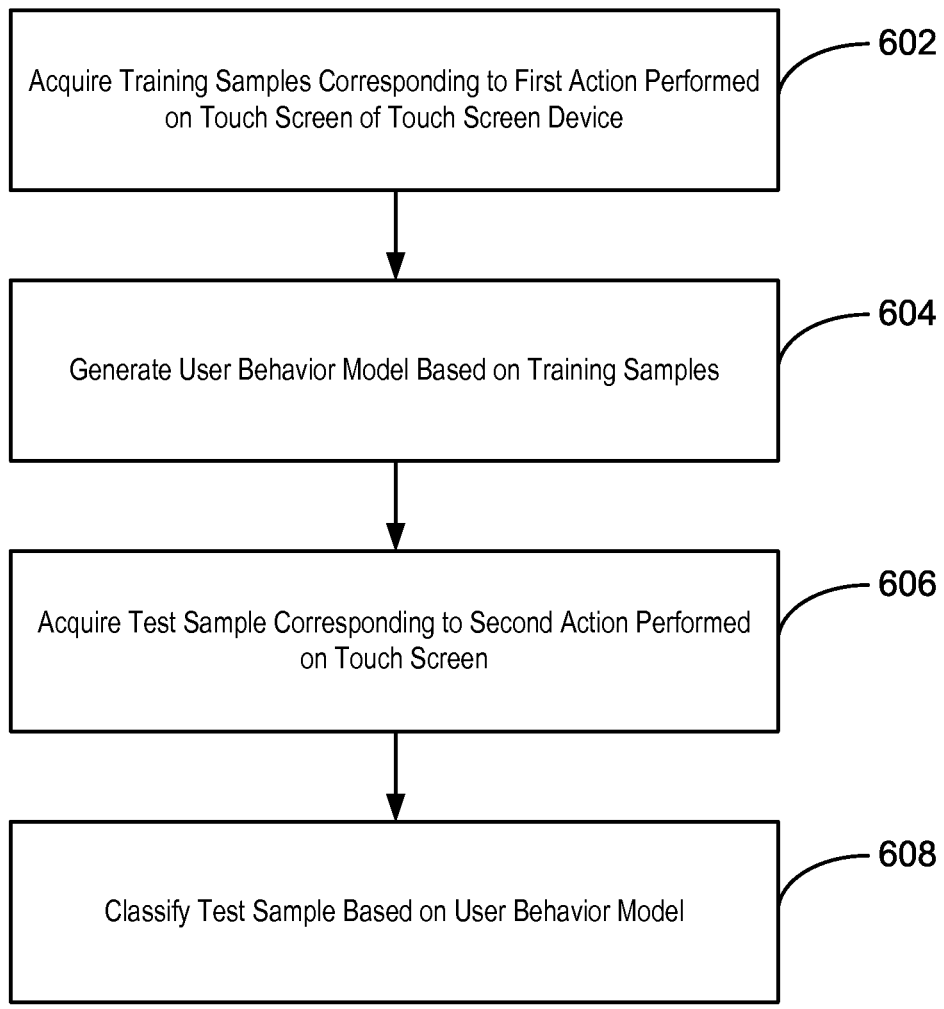
FIG. 6 is a process flow diagram of a method for behavior based authentication for touch screen devices.

FIG. 6 is a process flow diagram of a method 600 for behavior based authentication for touch screen devices. The method 600 may be implemented within any suitable type of touch screen device, such as a mobile phone, tablet computer, laptop computer, or the like. Moreover, in some embodiments, the method 600 may be implemented within the computing environment 100 described with respect to FIG. 1.

According to embodiments described herein, the method 600 is used to authenticate the user of the touch screen device based on the user's behavior of performing a particular action. The particular action may include the input of the user's personal signature or the input of one or more gestures on the touch screen of the device. The particular action may be performed on the touch screen of the device via the user's finger(s), a touch pen, or any other suitable type of touch input device.

The method 600 begins at block 602, at which training samples corresponding to a first action performed on the touch screen of the touch screen device are acquired. The first action includes an input of a signature or a gesture by a legitimate user. If the first action includes the input of a gesture, the first action may be performed using one or more of the user's fingers. However, if the first action includes the input of a signature, the first action may be performed using one or more of the user's fingers, a touch pen, or any other suitable type of touch input device.

At block 604, a user behavior model is generated based on the training samples. Specifically, features corresponding to the first action may be extracted from the training samples, and a portion of the features that have consistent values for all of the training samples may be selected. Behaviors corresponding to the portion of the features from the training samples may be extracted, and the training samples may be partitioned into training groups based on the behaviors corresponding to the portion of the features. Each training group may correspond to one of the behaviors. A user behavior model may then be generated each training group. In various embodiments, generating the user behavior model for each training group includes training a support vector distribution estimation (SVDE) based classifier for each training group.

At block 606, a test sample corresponding to a second action performed on the touch screen is acquired. The second action includes an input of the signature or the gesture by a user. When the test sample is acquired, the identity of the user who performed the second action is unknown.

At block 608, the test sample is classified based on the user behavior model. Classifying the test sample includes determining whether the user is the legitimate user or an imposter. In various embodiments, classifying the test sample includes extracting the portion of the features that have consistent values for all of the training samples from the test sample, extracting test behaviors corresponding to the portion of the features from the test sample, and comparing the test behaviors extracted from the test sample to the behaviors corresponding to the training groups based on the user behavior models.

In some embodiments, if it is determined that the user is the legitimate user, the user may be allowed to access the touch screen device. However, if it is determined that the user is an imposter (i.e., anyone other than the legitimate user), the user may be denied access to the touch screen device.

The process flow diagram of FIG. 6 is not intended to indicate that the blocks of the method 600 are to be executed in any particular order, or that all of the blocks are to be included in every case. Further, any number of additional blocks not shown in FIG. 6 may be included within the method 600, depending on the details of the specific implementation. For example, in some embodiments, the method 600 is executed for each of a number of actions performed on the touch screen, wherein each action includes an input of a specified gesture. Further, in some embodiments, the specified gestures are ranked based on the accuracy of the legitimate user in inputting the training samples for the corresponding actions, and a test sample corresponding to each action is acquired and classified in a descending order based on the ranking of the specified gestures. The user may then be determined to be the legitimate user if a majority of the classifications for the test samples corresponding to the actions determine that the user is the legitimate user.

The behavior based authentication procedure described herein may be used for a variety of applications. For example, financial institutions may use the behavior based authentication procedure may be used to help eliminate credit card frauds. For example, banks may request credit card holders to authenticate themselves by providing signatures on touch screen devices instead of simply signing a receipt whenever they make a purchase over a certain limit. Many shopping stores already have touch screen devices for users to provide their signatures after using their credit cards. Currently, however, the users are not authenticated using those signatures. Instead, the signatures are simply stored in a database. Therefore, according to the behavior based authentication procedure described herein, the touch screen devices that are already in use at shopping stores may be used to provide actual authentication for credit card users.

Furthermore, financial institutions may use the behavior based authentication procedure described herein to help eliminate ATM frauds. To illegally draw money from ATM machines, an attacker may install a passive card reading device on a public ATM. The passive card reading device may be used to read information contained on the magnetic strip of a debit card. In addition, a spy camera may be used to capture a video of the card holder entering his PIN code. The attacker may then create a fake debit card using the obtained information and withdraw money from the account using the fake debit card. Therefore, since ATMs typically include touch screens, the behavior based authentication procedure described herein may be used to help eliminate such fraudulent transactions by authenticating debit card users based on user behavior, rather than authenticating debit card users based only on the input of a PIN code.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for behavior based authentication for touch screen devices, comprising:
   acquiring a plurality of training samples corresponding to a first action performed on a touch screen of a touch screen device, wherein the first action comprises an input of a gesture by a legitimate user;
   generating a user behavior model based on the plurality of training samples, what features of the training samples by multiple users, and how features of the training samples by distinct users, wherein the what features comprise a displacement magnitude, and wherein the how features comprise the displacement magnitude;
   acquiring a test sample corresponding to a second action performed on the touch screen, wherein the second action comprises an input of the gesture by a user; and
   classifying the test sample based on the user behavior model, wherein classifying the test sample comprises determining whether the user is the legitimate user or an imposter, including by automatically adjusting a time resolution for each of a plurality of subparts of an input of the first action until and in order to obtain consistent feature values for the subparts for different locations of the first action.

2. The method of claim 1, wherein generating the user behavior model comprises:
   extracting features corresponding to the first action from the plurality of training samples;
   selecting a portion of the features that have consistent values for all of the plurality of training samples;
   extracting behaviors corresponding to the portion of the features from the plurality of training samples;
   partitioning the plurality of training samples into a plurality of training groups based on the behaviors corresponding to the portion of the features, wherein each of the plurality of training groups corresponds to one of the behaviors; and generating a user behavior model for each of the plurality of training groups.

3. The method of claim 2, wherein generating the user behavior model for each of the plurality of training groups comprises training a support vector distribution estimation (SVDE) based classifier for each of the plurality of training groups.

4. The method of claim 2, wherein classifying the test sample comprises:
  extracting the portion of the features that have consistent values for all of the plurality of training samples from the test sample;
  extracting test behaviors corresponding to the portion of the features from the test sample; and
  comparing the test behaviors extracted from the test sample to the behaviors corresponding to the plurality of training groups based on the user behavior models.

5. The method of claim 1, wherein the first action and the second action correspond to user authentication for the touch screen device, and wherein the method comprises:
  if the user is the legitimate user, allowing the user to access the touch screen device; and
  if the user is the imposter, denying the user access to the touch screen device.

6. The method of claim 1, wherein the first action and the second action correspond to user authentication for a credit card or a debit card.

7. The method of claim 1, comprising executing the method for each of a plurality of actions performed on the touch screen, wherein each of the plurality of actions comprises an input of a specified gesture.

8. The method of claim 7, comprising:
  ranking the specified gestures corresponding to the plurality of actions based on an accuracy of the legitimate user in inputting a plurality of training samples for the plurality of actions; and
  acquiring and classifying a test sample corresponding to each of the plurality of actions in a descending order based on the ranking of the specified gestures.

9. The method of claim 8, comprising determining that the user is the legitimate user if a majority of classifications for the test samples determine that the user is the legitimate user.

10. The method of claim 1, wherein the first action comprises an input of a specified gesture by one or more fingers of the legitimate user, and wherein the second action comprise an input of the specified gesture by one or more fingers of the user.

11. The method of claim 1, wherein the first action may be divided into subparts at a plurality of time resolutions.

12. A touch screen device, comprising:
  a touch screen;
  a processor that is adapted to execute stored instructions; and
  a system memory, wherein the system memory comprises code configured to:
    acquire a plurality of training samples corresponding to a first action performed on the touch screen, wherein the first action comprises an input of a signature by a legitimate user;
    generate a user behavior model based on the plurality of training samples, what features of the training samples by multiple users, and how features of the training samples by distinct users, wherein the what features comprise a displacement magnitude, and wherein the how features comprise the displacement magnitude;
    acquire a test sample corresponding to a second action performed on the touch screen, wherein the second action comprises an input of the signature by a user; and
    classify the test sample based on the user behavior model, wherein classifying the test sample comprises determining whether the user is the legitimate user or an imposter, including by automatically adjusting a time resolution for each of a plurality of subparts of an input of the first action until and in order to obtain consistent feature values for the subparts for different locations of the first action.

13. The touch screen device of claim 12, wherein the system memory comprises code configured to:
  extract features corresponding to the first action from the plurality of training samples;
  select a portion of the features that have consistent values for all of the plurality of training samples;
  extract behaviors corresponding to the portion of the features from the plurality of training samples;
  partition the plurality of training samples into a plurality of training groups based on the behaviors corresponding to the portion of the features, wherein each of the plurality of training groups corresponds to one of the behaviors; and
  generate a user behavior model for each of the plurality of training groups.

14. The touch screen device of claim 13, wherein the system memory comprises code configured to generate the user behavior model for each of the plurality of training groups by training a support vector distribution estimation (SVDE) based classifier for each of the plurality of training groups.

15. The touch screen device of claim 13, wherein the system memory comprises code configured to:
  extract the portion of the features that have consistent values for all of the plurality of training samples from the test sample;
  extract test behaviors corresponding to the portion of the features from the test sample; and
  classify the test sample by comparing the test behaviors extracted from the test sample to the behaviors corresponding to the plurality of training groups based on the user behavior models.

16. The touch screen device of claim 12, wherein the first action and the second action correspond to user authentication for the touch screen device, and wherein the system memory comprises code configured to:
  if the user is the legitimate user, allow the user to access the touch screen device; and
  if the user is the imposter, deny the user access to the touch screen device.

17. The touch screen device of claim 12, wherein the first action comprises an input of a specified gesture by one or more fingers of the legitimate user, and wherein the second action comprise an input of the specified gesture by one or more fingers of the user.

18. The touch screen device of claim 12, wherein the first action comprises an input of a signature by the legitimate user via a touch input device, and wherein the second action comprise an input of the signature by the user via the touch input device.

* * * * *